United States Patent [19]

Miller

[11] Patent Number: 4,974,183

[45] Date of Patent: Nov. 27, 1990

[54] COMPUTER KEYBOARD WITH THUMB-ACTUATED EDIT KEYS

[76] Inventor: Wendell E. Miller, 1907 Crescent Dr., Warsaw, Ind. 46580

[21] Appl. No.: 333,216

[22] Filed: Apr. 5, 1989

[51] Int. Cl.⁵ ............................................. G06F 3/023
[52] U.S. Cl. .............................. 364/709.12; 400/488; 400/489; 400/486
[58] Field of Search ......... 364/709.01, 709.12–709.16; 400/472, 476, 485–488, 489, 492

[56] References Cited

U.S. PATENT DOCUMENTS

| | | | |
|---|---|---|---|
| 1,717,765 | 6/1929 | Dunn | 400/476 |
| 3,945,482 | 3/1976 | Eunbinder | 400/488 |
| 4,042,777 | 8/1977 | Bequaert et al. | 364/709.12 |
| 4,522,518 | 6/1985 | Schmidt | 400/486 |
| 4,579,470 | 4/1986 | Casey | 400/486 |
| 4,761,522 | 8/1988 | Allen | 400/485 |
| 4,769,516 | 9/1988 | Allen | 400/485 |
| 4,824,268 | 4/1989 | Diernisse | 400/486 |

FOREIGN PATENT DOCUMENTS

| | | | |
|---|---|---|---|
| 2725677 | 12/1977 | Fed. Rep. of Germany | 400/489 |
| 2587815 | 3/1987 | France | 400/472 |
| WO88/00137 | 1/1988 | PCT Int'l Appl. | 400/489 |
| 2000083 | 1/1977 | United Kingdom | 400/486 |
| 2122947 | 1/1984 | United Kingdom | 400/472 |

OTHER PUBLICATIONS

Boyd, "Keyboard Training", *British Printer*, Sep. 1977, pp. 20–21.
Conway, "Digital X Typewriter Keyboard", *IBM Technical Disclosure Bulletin*, vol. 18, #12, pp. 4187–4190, May, 1976.
Truelson, "Single-Key Cursor Control" *IBM Technical Disclosure Bulletin*, vol. 26, #7B, pp. 3746–3747, Dec. 1983.
*IBM Technical Disclosure Bulletin*, "Compact Computer Keyboard", vol. 27, #10A, pp. 5640–5642, Mar. 1985.

*Primary Examiner*—Dale M. Shaw
*Attorney, Agent, or Firm*—Wendell E. Miller

[57] ABSTRACT

A keyboard (10) is provided for use with computer type devices. The keyboard (10) provides thumb-actuated keys (52, 54, 56, and 58) for controlling the cursor in all four directions without removing either hand (42a or 42b) from its home position (40a or 40b); and the keyboard (10) includes thumb-actuated keys (62, 64, 66, 68, 70, 72, 74, 76, and 78) for performing other text-control operations without removing either hand (42a or 42b) from its home position (40a or 40b). The character keys (18) are divided into two spaced-apart groups (28a and 28b); and a function-control pad (34), which includes function keys (38), is disposed in longitudinally-disposed and laterally-staggered rows (36a, 36b, and 36c), and is interposed between the groups (28a and 28b) of the character keys (18). Some of the function keys (90a and 90b) include heights (80), top-surface profiles (88a or 88b), and/or side-surface profiles (92a or 92b), as an aid in positioning the hands (42a and 42b) in the home row (20) and in home positions (40a and 40b), and as an aid in distinguishing the various rows (36a, 36b, and 36c) of function keys (38) by feel.

20 Claims, 3 Drawing Sheets

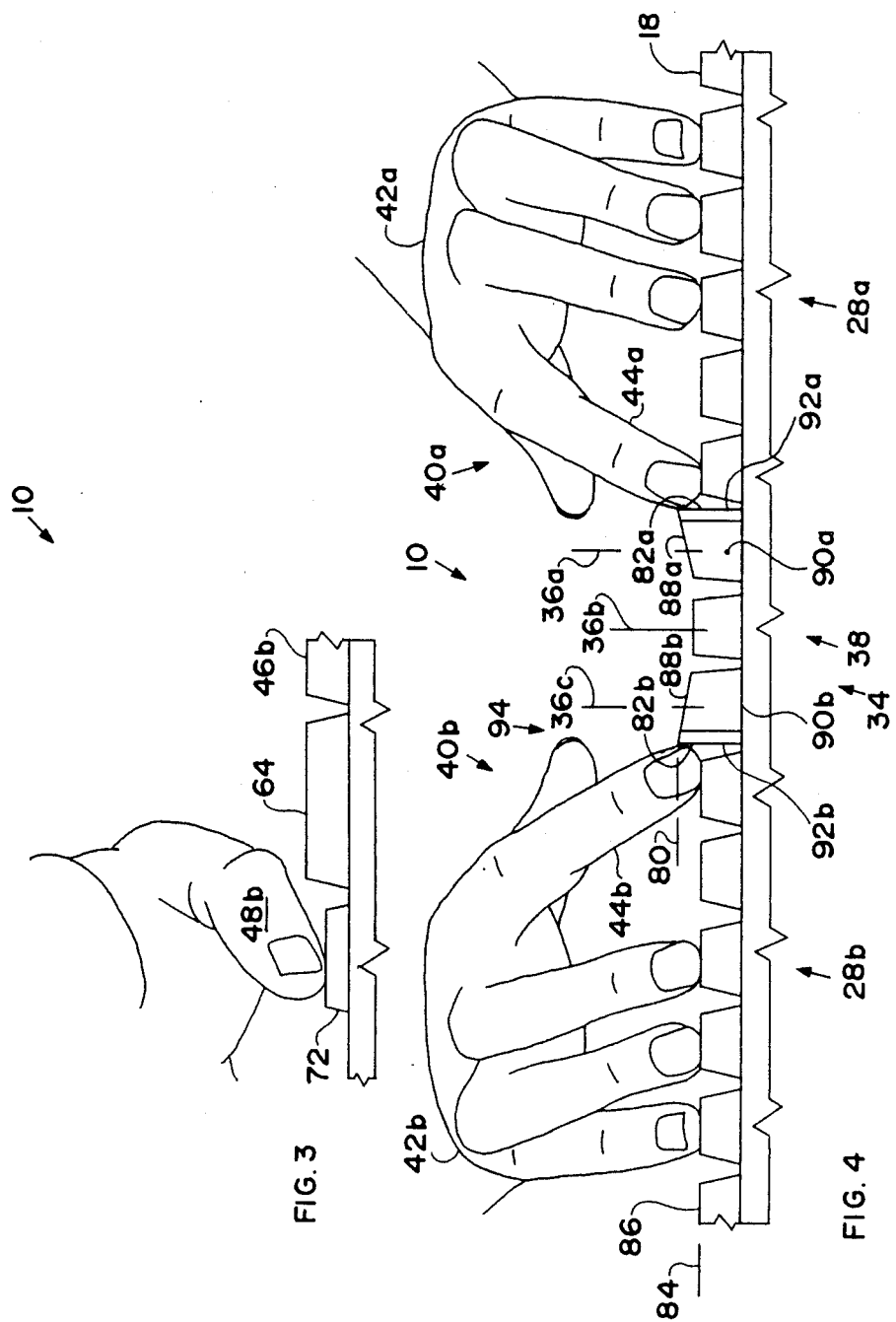

COMPUTER KEYBOARD WITH THUMB-ACTUATED EDIT KEYS

BACKGROUND OF THE INVENTION

1. Field of the Invention

The present invention relates to a keyboard for a computer. More particularly, the present invention relates to a keyboard for a computer in which a plurality of cursor-control and edit-control functions may be thumb-actuated, and in which an operator may keep his hands on their respective home positions on the keyboard while accomplishing the cursor-control and edit-control functions.

2. Description of the Related Art

Most keyboards for typewriters, computers, etc. have arranged the keys in straight and transversely-disposed rows; and commonly the Qwerty arrangement has been used for the alphabetic keys.

For computers, the cursor-control keys have been included as a part of the number pad, as illustrated in U.S. Pat. No. 4,121,048 which was issued to Dev Choudhury. Or the cursor-control keys have been a pad that is separate from the number pad so that cursor control is not inactivated when the number pad is locked for entry of numbers.

A large variety of specialized keyboards have been patented. The design object of these new keyboards has been rapid and accurate entry of text or data. Very little attention has been given to providing ease in cursor-control and/or manipulation of text as required for editing functions; and yet, cursor-control and manipulation of text are the most time-consuming parts of editing since they require removing one hand from the home position on the keyboard. Further, the most troublesome parts of creative writing are cursor-control and text manipulation, since text rearrangement and editing requires moving one of the hands from the home position.

More particularly, little attention has been paid to providing means for easy actuation of cursor-control keys, the BACKSPACE key, the DELETE key, the INSERT key, the HOME key, the END key, the PAGE-UP and PAGE-DOWN keys, and the SCREEN-UP and SCREEN-DOWN keys. Thus, editing of text has required one or both hands to be removed from their respective home positions each time a text-editing manipulation is made.

Special keyboards in which character keys are spaced in a generally conventional manner, that is, in a plurality of straight rows, include Jones et al., U.S. Pat. No. 3,927,752; Choudhury, U.S. Pat. No. 4,121,048; Schmidt, U.S. Pat. No. 4,522,518; Nakayama, et al., U.S. Pat. No. 4,531,119; and Merner et al., U.S. Pat. No. 4,602,878.

Illig et al., U.S. Pat. No. 3,698,533; and Shelton, U.S. Pat. No. 3,970,185 teach keyboards in which the keys are arranged nonconventionally, but are arranged in generally straight rows.

Malt, U.S. Pat. No. 4,244,659; Einbinder, U.S. Pat. Nos. 3,929,216 and 3,945,482; and Casey 4,579,470 all teach keyboards in which the keys are not distributed in left and right keypads and in which the arrangement of the keys is not in straight rows.

Malt, U.S. Pat. No. 4,244,659; Einbinder, U.S. Pat. Nos. 3,929,216 and 3,945,482; Casey 4,579,470; Illig et al., U.S. Pat. No. 3,698,533; and Schmidt, U.S. Pat. No. 4,522,518 teach more utilization of thumb actuation than is taught in conventional keyboards.

Schmidt, in U.S. Pat. No. 4,522,518 teaches a keyboard in which left and right-hand portions of the keyboard are spaced apart and keys for controlling the cursor, editing keys, arithmetic operator key, numerical keys, punctuation keys, etc. are interposed between the character keys.

Einbinder, U.S. Pat. Nos. 3,929,216 and 3,945,482, teaches slanted key tops and keys of varying heights to follow the architecture of the hand.

SUMMARY OF THE INVENTION

In the present invention, a keyboard is provided in which the keyboard includes an operator side, a distal side, and left and right ends as viewed by an operator.

The keyboard includes a plurality of character keys, a pair of spaced-apart SPACE keys that are interposed between the character keys and the operator side of the keyboard, and thumb-actuated edit-control keys. The edit-control keys include thumb-actuated cursor-control keys for controlling all four directions of cursor movement without the necessity of moving either hand from the home position thereof on the keyboard.

The keyboard includes additional edit-control keys, all of which are thumb-actuated, and all of which may be actuated without removing either hand from the home position thereof. These additional edit-control keys include a BACKSPACE key, a DELETE key, an INSERT key, a HOME key, an END key, PAGE-UP and PAGE-DOWN keys, and SCREEN-UP and SCREEN-DOWN keys.

The character keys of the present invention are disposed in laterally-disposed rows; and the laterally-disposed rows are laterally staggered one from the other, as is common in keyboards. However, in the present invention, the character keys are spaced apart into two groups; and one or more longitudinally-disposed and laterally-staggered rows of function keys are interposed between the two groups of character keys.

The function keys have top surfaces that extend upwardly above the character keys, so that the function keys can be distinguished from the character keys by feel, and so that an operator can feel the sides of two of the function keys with his index fingers as an aid in positioning his hands in their respective home positions.

The top surfaces of some of the function keys are profiled so that they may be distinguished from other function keys by feel, and the side surfaces of two of the function keys are profiled to help an operator position his hands in their respective home positions.

It is a primary object of the present invention to provide a keyboard in which the cursor can be moved in all four directions by thumb actuation, and without moving either hand from the respective home position thereof.

It is an object of the present invention to provide a keyboard in which the cursor can be moved in all four directions by thumb actuation, and all other text manipulations for text-editing functions can be accomplished by thumb actuation, and without moving either hand from the respective home position thereof.

It is another object of the invention to provide a keyboard in which the versatility of the thumb is fully utilized with a thumb-actuated key being located beside a SPACE key, between two SPACE keys, between a SPACE key and an end of the keyboard, and/or between a SPACE key and the operator side of the keyboard.

It is another object of the present invention to provide a keyboard in which function keys are interposed between two groups of character keys in longitudinally-disposed and laterally-staggered rows.

It is another object of the present invention to provide a keyboard in which a group of function keys is interposed between two groups of function keys, the function keys extend upwardly above the character keys, and the function keys include the top-surface and/or side-surface profiles to assist in distinguishing various rows of keys, and various keys, by feel.

Finally, it is an object of the present invention to accomplish all of the above-recited advantages with a keyboard in which those having conventional typing skills can utilize the new keyboard with a minimum of confusion and learning time.

Other objects of the invention will become obvious from the drawings and detailed description that are included herein.

BRIEF DESCRIPTION OF THE DRAWINGS

FIG. 3 is a partial front view of the keyboard of FIG. 1, taken substantially as shown by view line 3—3 of FIG. 1, showing one thumb actuating one of two edit-control keys that are disposed between one SPACE key and one end of the keyboard; and FIG. 4 is a partial front view of the keyboard of FIG. 1, taken substantially as shown by view line 4—4 of FIG. 1, showing index fingers feeling the sides of two of the function keys, and showing the top-surface profile of two of the function keys.

DESCRIPTION OF THE PREFERRED EMBODIMENTS

Figure 1:
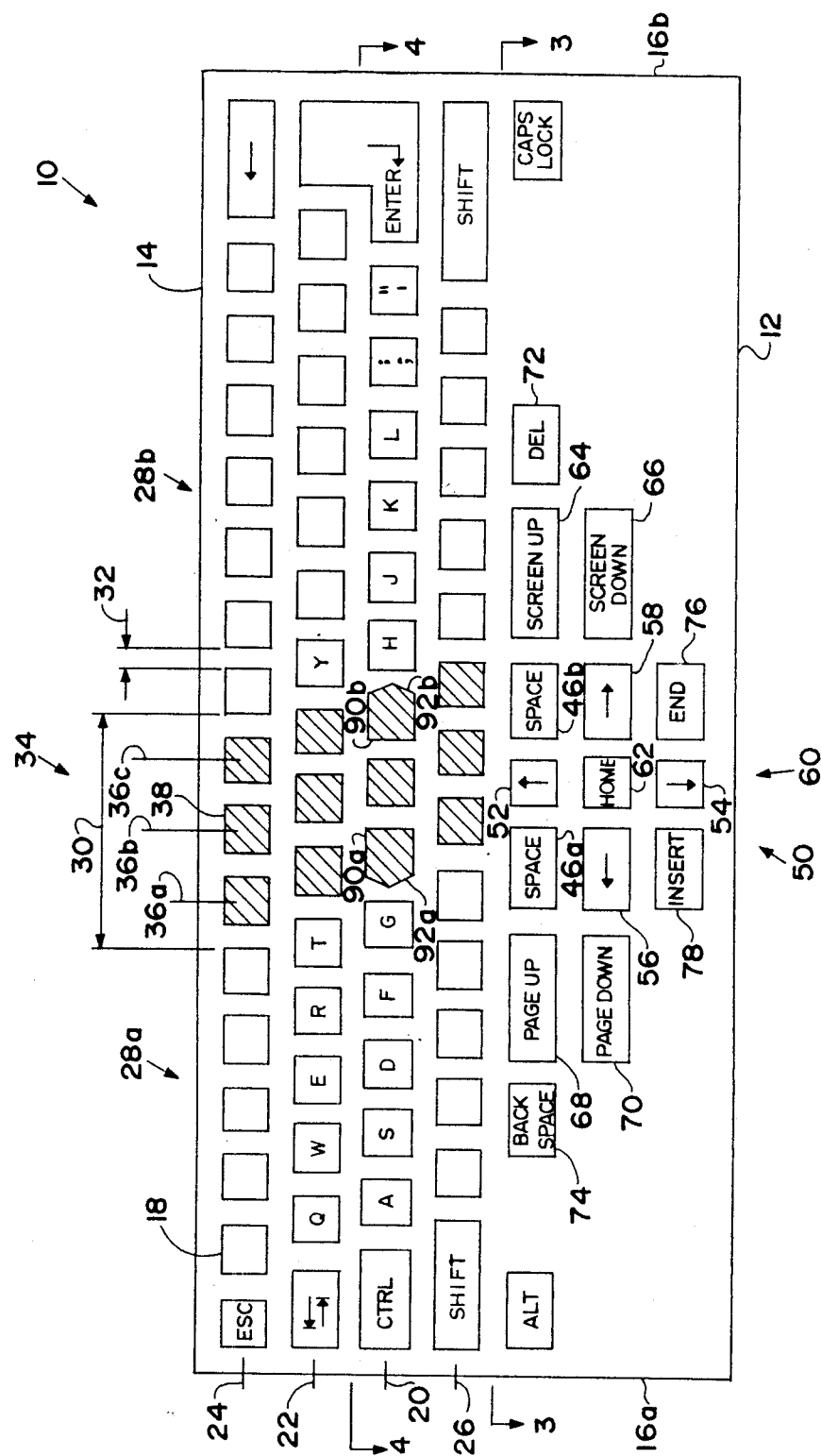
FIG. 1 is a plan view of a preferred embodiment of the keyboard of the present invention.

Referring now to the drawings, and more particularly to FIG. 1, a keyboard 10 is provided for use with computer-type machines (not shown, not a part of the present invention) in which a cursor is moveable in left and right horizontal directions and up and down vertical directions on a monitor (not shown, not a part of the present invention).

The keyboard 10 includes an operator side 12 and a distal side 14, a left end 16a and a right end 16b, and a plurality of character keys 18.

The character keys 18 are arranged in a plurality of laterally-disposed rows (20, 22, 24, and 26) that are staggered laterally with respect to each other, namely: a home row 20, a second row 22 that is disposed between the home row 20 and the distal side 14, a third row 24 that is disposed between the second row 22 and the distal side 14, and a fourth row 26 that is disposed between the home row 20 and the operator side 12.

Looking at the keyboard 10, "longitudinal" is orthogonal to the operator side 12 and the distal side 14 of the keyboard; and "lateral" is orthogonal to longitudinal, or orthogonal to the left end 16a and the right end 16b of the keyboard 10.

The character keys 18 are arranged in an array which commonly is know as Qwerty, although the present invention is applicable to other key arrangements, whether arranged by factory design, by programming, or by manually switching.

The character keys are arranged in two spaced-apart groups, 28a and 28b, by a space, or distance, 30 that is greater than spaces 32 between individual ones of the character keys 18.

A function-control pad 34 is disposed in the space 30 between the spaced-apart groups 28a and 28b. The function-control pad 34 includes function keys that are disposed in the laterally-disposed rows 20, 22, 24, and 26 of the character keys 18, and that are laterally-staggered with respect to adjacent ones of the rows 20, 22, 24, and 26. Or, the function keys 38 may be said to be in longitudinally-disposed and laterally-staggered rows, 36a, 36b, and 36c, of function keys 38.

Figure 2:
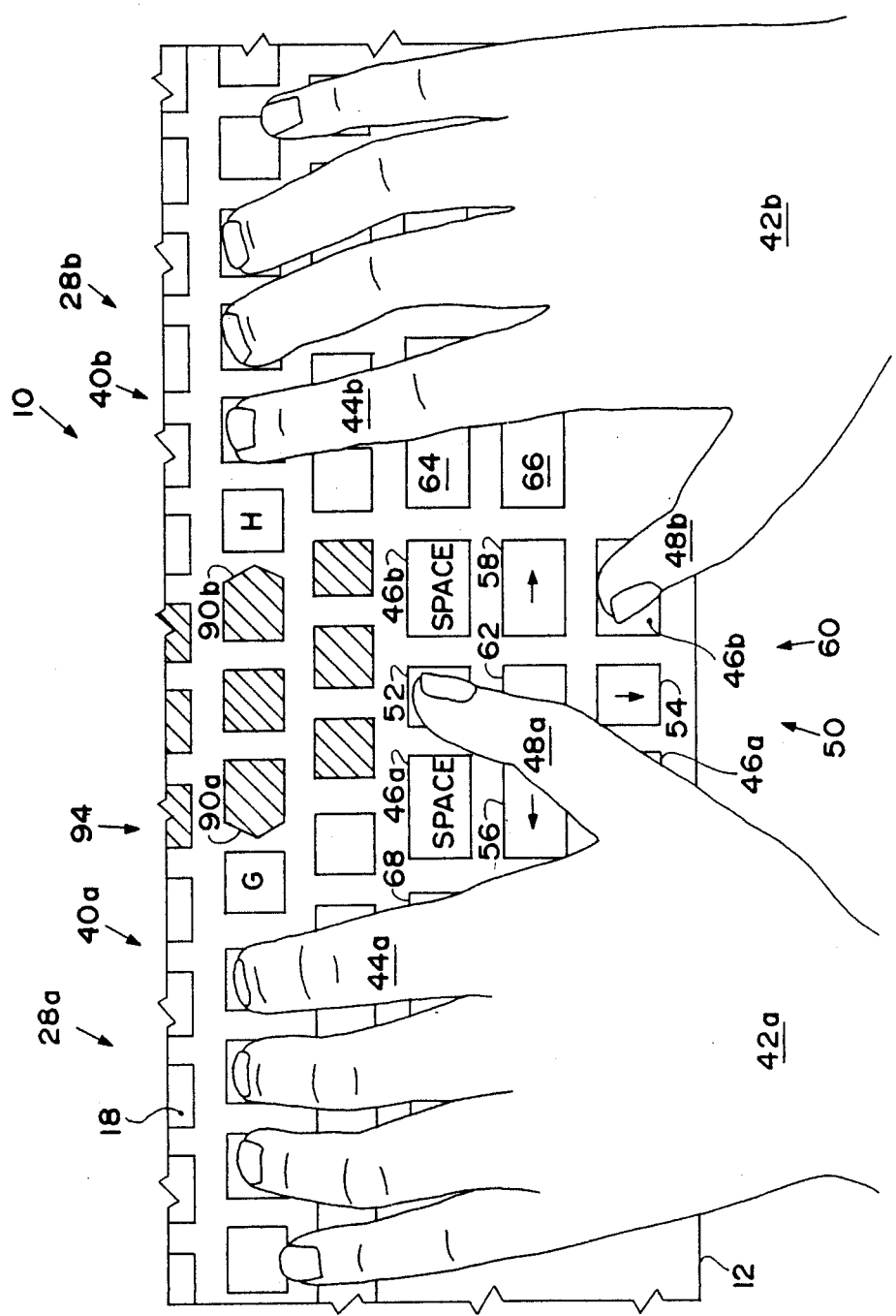
FIG. 2 is a partial plan view of the keyboard of FIG. 1, taken substantially the same as FIG. 1, showing the hands in their respective home positions, showing one thumb on the UP cursor-control key, and showing the other thumb on the END key.

Referring now to FIGS. 1 and 2, the keyboard 10 includes home positions, 40a and 40b, as shown in FIG. 2, wherein the character keys 18 may be struck without moving either of the hands, 42a or 42b, from their home positions, 40a and 40b. When in the home positions, 40a and 40b, index fingers, 44a and 44b, rest on the "F" and "J" keys, as shown.

The keyboard 10 includes first and second thumb-actuated SPACE keys, 46a and 46b, which are arranged for natural access by thumbs, 48a and 48b, and which replace the usual space bar, not shown.

A plurality of thumb-actuated edit-control keys 50 are interposed between the SPACE keys, 46a and 46b, and the ends, 16a and 16b, and between the SPACE keys, 46a and 46b, and the operator side 12 of the keyboard 10.

The edit-control keys, 50, provide means for thumb actuation of all, or nearly all, text-manipulating functions that are required for both creative composition and text editing.

The edit-control keys 50 include a thumb-actuated UP cursor-control key, 52, a thumb-actuated DOWN cursor-control key 54, a thumb-actuated LEFT cursor-control key 56, and a thumb-actuated RIGHT cursor-control key 58. The cursor-control keys, 52, 54, 56, and 58, provide thumb-actuated cursor-control means, 60 for moving the cursor, not shown, in all four directions, namely left and right horizontal directions and up and down vertical directions, without moving either of the hands, 42a or 42b, from the home position, 40a or 40b, thereof.

A thumb-actuated edit-control HOME key, 62 is interposed between the cursor-control keys, 52 and 54, and between the cursor-control keys, 56 and 58.

A thumb-actuated edit-control SCREEN-UP key, 64, is interposed between the SPACE key 46b and the right end 16b of the keyboard 10; and a thumb-actuated edit-control SCREEN-DOWN key, 66 is interposed between the SCREEN-UP key 64 and the operator side 12 of the keyboard 10. In like manner, a thumb-actuated edit-control PAGE-UP key, 68, is interposed between the SPACE key 46a and the left end 16a of the keyboard 10; and a thumb-actuated edit-control PAGE-DOWN key, 70, is interposed between the PAGE-UP key 68 and the operator side 12 of the keyboard 10.

A thumb-actuated edit-control DELETE key, 72, that deletes text and/or spaces to the right of the cursor, is interposed between the SCREEN-UP key 64 and the right end 16b of the keyboard 10; and a thumb-actuated edit-control BACKSPACE or DELETE key, 74, that deletes text and/or spaces to the left of the cursor, is interposed between the PAGE-UP key 68 and the left end 16a of the keyboard 10. The DELETE key 74 is the key that commonly is marked with an arrow pointing to the left.

Two more thumb-actuated edit-control keys, 76 and 78 are included. The edit-control key 76 is shown as a thumb-actuated END key, and is interposed between the RIGHT cursor-control key 58 and the operator side 12 of the keyboard 10. The edit-control key 78 is shown as the INSERT/TYPEOVER key and is interposed between the LEFT cursor-control key 56 and the operator side 12 of the keyboard.

The versatility of the human thumb, and the use of the thumb 48b in striking the DELETE key 72 is shown in FIG. 3.

Referring now to FIGS. 1 and 2, the function keys 38 are crosshatched to indicate that there is a color difference between the function keys 38 and the groups 28a and 28b of character keys 18. This difference in color takes away any confusion, or apparent complexity, of having the function keys 38 interposed between the groups, 28a and 28b, of character keys 18. Of course, the function keys 38 would be numbered in the usual manner (not shown).

Referring now to FIG. 4, the function keys 38 are also distinguished from the character keys 18 by heights 80 at outer edges 82a and 82b of rows 36a and 36c that are higher than heights 84 of top surfaces 86 of the character keys 18. The higher heights 80 provide means for locating the hands, 42a and 42b, in their home positions, 40a and 40b, by touching the higher heights 80 with the index fingers, 44a and 44b.

The function keys 38 of the row 36a are sloped, or profiled, with a top-surface profile 88a which differentiates them from the function keys 38 of the rows 36b and 36c; and the function keys 38 of the row 36c are sloped, or profiled, with a top-surface profile 88b which differentiates them from the function keys 38 of the rows 36a and 36b. The top-surface profiles, 88a and 88b, serve to distinguish the function keys 38 of one row, 36a, 36b, or 36c, from the function keys 38, of another row, 36a, 36b, or 36c, and also to distinguish the function keys 38 from the character keys 18.

As shown in FIGS. 1, 2, and 4, the function keys 38 include side-profiled function keys, or function keys, 90a and 90b. The side-profiled function keys, 90a and 90b, are disposed in the same row as the home row 20 of the character keys 18, and include side-surface profiles 92a and 92b. The side-surface profiles, 92a and 92b, provide means for distinguishing, by feel, the ones of the function keys 38 that are on the home row 20.

Thus side-surface profiles, 92a and 92b, help an operator to place his hands, 42a and 42b, in their home positions, 40a and 40b, by feeling the side-surface profiles, 92a and 92b, with the index fingers, 44a and 44b, respectively.

It can be seen that the higher heights 80 of the function keys 38, the top-surface profiles 88a and 88b of the function keys 38, and the side-surface profiles 92a and 92b of the side-profiled function keys 90a and 90b work together to provide a home-position locator means 94 for locating the hands 42a and 42b in their home positions, 40a and 40b.

In summary, the present invention provides thumb-actuated edit-control means 50 for moving a cursor in all four directions, and for thumb-actuated control of all other text-manipulating operations that are required in text-editing and/or creative composition, thereby obviating the necessity of taking either hand away from the home position thereof.

For purposes of understanding the claims, edit-control means for text-manipulating functions includes both cursor-control means and text-control means. Cursor-control means includes those text-editing functions in which the cursor moves, or the text moves on the monitor, without spacing or erasing the text; and text-control means includes both erasing and spacing functions.

Further, for purposes of understanding the claims, the cursor is said to move vertically whether the cursor moves on the monitor, or whether the text moves on the monitor, repositioning the cursor on the text. In addition, for purposes of understanding the claims, a computer is any keyboard-controlled device in which a cursor moves on some type of visual device, such as an electron-beam tube or an LCD device, whether the computer be a computer-chip controlled typewriter, a dedicated word processor, a typesetter, or any other type of computer.

While specific apparatus and method have been disclosed in the preceding description, and while part numbers have been inserted parenthetically into the claims to facilitate understanding of the claims, it should be understood that these specifics have been given for the purpose of disclosing the principles of the present invention and that many variations thereof will become apparent to those who are versed in the art. Therefore, the scope of the present invention is to be determined by the appended claims, and without any limitation by the part numbers inserted parenthetically in the claims.

INDUSTRIAL APPLICABILITY

The present invention is applicable to keyboards for computer-type devices in which text-manipulating operations are performed, such as moving a cursor in horizontal and vertical directions, and/or moving text vertically, whether these devices be computer-chip controlled typewriters, dedicated word processors, typesetters, or other types of computers.

What is claimed is:

1. A keyboard (10) for a computer having a monitor for displaying characters, and having a cursor that is movable in left and right horizontal directions and in up and down vertical directions on said monitor, which keyboard comprises:

an operator side (12) and a distal side (14);
a left end (16a) and a right end (16b) as viewed by an operator;
a plurality of character keys (18) being disposed between said operator side and said distal side, and being disposed in an array wherein said character keys may be struck while the hands (42a and 42b) of said operator are generally in left-hand and right-hand home positions (40a and 40b);
cursor-control means (60), comprising a cursor-control key (52), for moving said cursor in all four of said directions without the necessity of moving either of said hands from said home positions; and
said cursor-control means further comprises means for actuating said cursor-control key with the thumb (48a or 48b) of either of said hands without the necessity of moving either of said hands from said home positions.

2. A keyboard (10) as claimed in claim 1 in which said cursor-control means comprises thumb-actuated means (60) for thumb-actuating said cursor in all four of said directions without the necessity of moving either of said hands (42a or 42b) from said home positions.

3. A keyboard (10) as claimed in claim 1 in which said keyboard includes edit-control means (50), comprising a thumb-actuated edit-control key (64, 66, 68, 70, 72, 74, 76, or 78), for performing an additional text-manipulating function without the necessity of moving either of said hands (42a or 42b) away from the respective ones of said home positions (40a and 40b).

4. A keyboard (10) as claimed in claim 3 in which said thumb-actuated edit-control key (64, 66, 68, 70, 72, 74, 76, or 78) is disposed generally between said cursor-control means (60) and one (16a or 16b) of said ends of said keyboard.

5. A keyboard (10) as claimed in claim 3 in which said keyboard includes a thumb-actuated SPACE key (46a or 46b); and
said thumb-actuated edit-control key (64, 66, 70, 76, or 78) is disposed generally between said SPACE key and said operator side (12) of said keyboard.

6. A keyboard (10) as claimed in claim 3 in which said keyboard includes a thumb-actuated SPACE key (46a or 46b);
said cursor-control means is disposed generally between said SPACE key and one (16a or 16b) of said ends of said keyboard; and
said thumb-actuated edit-control key (64, 68, 72, or 74) is disposed generally between said SPACE key and the other of said ends of said keyboard.

7. A keyboard (10) for a computer having a monitor for displaying characters, and having a cursor that is movable in left and right horizontal directions and in up and down vertical directions on said monitor, which keyboard comprises:
an operator side (12) and a distal side (14);
a left end (16a) and a right end (16b) as viewed by an operator;
a plurality of character keys (18) being disposed between said operator side and said distal side, and being disposed in an array wherein said character keys may be struck while the hands (42a and 42b) of said operator are generally in left-hand and right-hand home positions (40a and 40b);
first and second thumb-actuated SPACE keys (46a and 46b) being interposed between said character keys and said operator side of said keyboard;
thumb-actuated cursor-control means (60), comprising an UP cursor-control key (52), a DOWN cursor-control key (54), a LEFT cursor-control key (56), and a RIGHT cursor-control key (58), and being interposed partially between said SPACE keys, for moving said cursor in all four of said directions without the necessity of moving either of said hands from said home positions; and
said thumb-actuated cursor-control means includes means for actuating two of said cursor-control keys (52 and 54) with either thumb (48a or 48b) without the necessity of moving either of said hands from said home positions.

8. A keyboard (10) as claimed in claim 7 in which said keyboard includes edit-control means, comprising a thumb-actuated edit-control key (50), for executing an edit-control function (HOME, PAGE-UP, PAGE-DOWN, SCREEN-UP, SCREEN-DOWN, DELETE, BACKSPACE, INSERT, or END) without the necessity of removing either of said hands (42a or 42b) from their respective home positions thereof.

9. A keyboard (10) as claimed in claim 8 in which said edit-control means comprises a thumb-actuated edit-control key (50) that is interposed between said UP and DOWN cursor-control keys (52, 54) and between said LEFT and RIGHT cursor-control keys (56, 58).

10. A keyboard (10) as claimed in claim 8 in which said edit-control means comprises a thumb-actuated DELETE key (72 or 74) that is interposed between one of said SPACE keys (46a or 46b) and one (16a or 16b) of said ends of said keyboard.

11. A keyboard (10) as claimed in claim 8 in which said edit-control means comprises thumb-actuated means (68 or 70) for moving said cursor a page at a time.

12. A keyboard (10) as claimed in claim 8 in which said edit-control means comprises thumb-actuated means (64 or 66) for moving said cursor a screen at a time.

13. A keyboard (10) for a computer having a monitor for displaying characters, and having a cursor that is movable in left and right horizontal directions and in up and down vertical directions on said monitor, which keyboard comprises:
an operator side (12) and a distal side (14);
a left end (16a) and a right end (16b) as viewed by an operator;
a plurality of character keys (18) being disposed between said operator side and said distal side, and being disposed in an array wherein said character keys may be struck while the hands (42a and 42b) of said operator are generally in left-hand and right-hand home positions (40a and 40b);
thumb-actuated means (60), comprising LEFT and RIGHT cursor-control keys (56, 58) that are disposed substantially equal distances from said operator side, for moving said cursor left and right without moving either of said hands from said keyboard; and
said thumb-actuated means (60) comprises UP and DOWN cursor-control keys (52, 54), that are disposed at substantially equal distances from both of said hands, for moving said cursor up or down by the thumbs (48a or 48b) of either of said hands without moving either of said hands from said home positions thereof.

14. A keyboard (10) as claimed in claim 13 in which said keyboard includes first and second SPACE keys (46a and 46b); and
one (52) of said cursor-control keys is interposed between said SPACE keys.

15. A keyboard (10) as claimed in claim 13 in which said keyboard includes edit-control means (50) for thumb-actuated execution of an edit-control function (HOME, PAGE-UP, PAGE-DOWN, SCREEN-UP, SCREEN-DOWN, DELETE, INSERT, or END).

16. A keyboard (10) as claimed in claim 15 in which said edit-control means (50) comprises a thumb-actuated edit-control key (62) that is interposed between two (52 and 54, or 56 and 58) of the four said cursor-control keys.

17. A keyboard (10) as claimed in claim 15 in which said edit-control means (50) comprises a thumb-actuated edit-control key (62, 76, or 78) that is interposed between one (52, 56, or 58) of said cursor-control keys and said operator side (12) of said keyboard.

18. A keyboard (10) as claimed in claim 15 in which said edit-control means (50) comprises a thumb-actuated edit-control key (64, 66, 68, 70, 72, 74, 76, or 78) that is interposed between one of said cursor-control keys (52, 54, 56, or 58) and one (16a or 16b) of said ends of said keyboard.

19. A keyboard (10) as claimed in claim 15 in which said keyboard comprises a thumb-actuated SPACE key (46a or 46b); and said edit-control means (50) comprises a thumb-actuated edit-control key (62, 66, 70, 76, or 78) that is interposed generally between said SPACE key and said operator side (12) of said keyboard.

20. A keyboard (10) as claimed in claim 15 in which said keyboard comprises a thumb-actuated SPACE key (46a or 46b); and said edit-control means (50) comprises a thumb-actuated edit-control key (64, 68, 72, or 78) that is interposed generally between said SPACE key and one of said ends (16a or 16b) of said keyboard.

* * * * *